United States Patent [19]

Trovato et al.

[11] Patent Number: 5,788,336

[45] Date of Patent: Aug. 4, 1998

[54] ANTI-LOCK BRAKE WARNING SYSTEM

[75] Inventors: Karen L. Trovato, Putnam Valley, N.Y.; James T. Howley, Stamford, Conn.

[73] Assignee: Philips Electronics North America Corporation, New York, N.Y.

[21] Appl. No.: 345,915

[22] Filed: Nov. 28, 1994

Related U.S. Application Data

[63] Continuation of Ser. No. 91,638, Jul. 14, 1993, abandoned.

[51] Int. Cl.$^6$ ........................................ B60T 17/00
[52] U.S. Cl. ........................ 303/1; 340/466; 340/467; 340/474
[58] Field of Search ................. 303/91, 1; 188/1.11; 340/463, 466, 467, 474, 479

[56] References Cited

U.S. PATENT DOCUMENTS

| | | | |
|---|---|---|---|
| 1,596,216 | 8/1926 | Pangburn . | |
| 1,859,515 | 5/1932 | Kageyama | 340/474 |
| 1,893,371 | 1/1933 | Knowlton | 340/474 X |
| 3,683,329 | 8/1972 | Sattler | 340/474 X |
| 4,742,310 | 5/1988 | Kato et al. | 330/281 |
| 4,833,469 | 5/1989 | David | 340/901 |
| 4,876,525 | 10/1989 | Gross | 340/479 X |
| 5,017,904 | 5/1991 | Browne et al. . | |
| 5,034,984 | 7/1991 | Bose | 381/86 |
| 5,139,115 | 8/1992 | Brown et al. | 303/91 |
| 5,220,307 | 6/1993 | May et al. | 340/439 |

OTHER PUBLICATIONS

National Semiconductor, "LM 311 Voltage Comparator".
"Import Service", Dec. 1990, pp. 16–22.
"Taurus and Sable Electrical Schematics 1991".

*Primary Examiner*—Lee W. Young
*Attorney, Agent, or Firm*—Robert J. Kraus

[57] ABSTRACT

Warning of engagement of a vehicle's ABS is provided by a warning sound such as a horn or pre-recorded sound. The warning sound is produced when the vehicle's speed exceeds a predetermined threshold. Alternatively, the warning sound may be adjusted to increase in volume with higher speeds. The warning sound warns drivers outside the vehicle.

10 Claims, 3 Drawing Sheets

ANTI-LOCK BRAKE WARNING SYSTEM

This is a continuation of application Ser. No. 07/091,638, filed on Jul. 14, 1993 now abandoned.

BACKGROUND OF THE INVENTION

A. Field of the Invention

The invention relates to the field of anti-lock braking systems (ABS) and in particular to warning mechanisms for indicating that an ABS system is in use.

B. Related Art

ABS is an increasingly common safety feature on automobiles. This feature improves stopping distance by preventing wheel locking, with its accompanying skidding, during emergency stops. These anti-lock brakes measure the relative speeds of the wheels while the vehicle is braking. If the relative speeds indicate that one wheel is braking more quickly than the others, then the brake fluid pressure is modulated. Other systems base the modulation decision upon the difference between a reference speed and input from the individual wheel sensors. This causes periodic release of the brakes which produces better braking traction with the road.

Conventional braking systems, which did produce skidding in emergency situations, had the advantage that the skidding tires produced a characteristic squealing sound which signalled all around that there was an emergency situation. Unfortunately, by eliminating the skidding, ABS also eliminates the warning squealing. As a result, pedestrians and motorists around the car equipped with ABS will not be alerted to the emergency situation encountered by that car. This drawback may result, for instance, in the ABS-equipped car being rear-ended.

It has been proposed, see U.S. Pat. No. 4,876,525 and 5,017,904 that the car equipped with ABS have a blinking brake light. It has also been proposed to alert the driver of the ABS-equipped car by sounding a chime when ABS is engaged, see U.S. Pat. No. 5,139,115.

These proposals have the drawback that only one following vehicle and the driver of the ABS-equipped vehicle are alerted to the emergency. Unfortunately, with the crowded conditions on urban and suburban roadways, this is not necessarily sufficient warning. By contrast, the conventional squealing would alert everyone within a short radius of the emergency.

SUMMARY OF THE INVENTION

It is an object of the invention to overcome the above drawback. The above drawback is overcome by causing the automobile to emit a warning sound when the ABS is engaged. The warning sound should be loud enough so that adjacent drivers and those beyond can hear it. The volume of the sound should preferably be generated in response to the speed of the emitting vehicle.

In one embodiment, the sound is generated by the automobile horn. In another embodiment, loud signal is a pre-recorded sound.

In another aspect of the invention, a sensor determines the speed of the vehicle at the time ABS in engaged; and the loud signal is only produced when the speed exceeds a predetermined threshold.

BRIEF DESCRIPTION OF THE DRAWING

The invention will now be described by way of non-limitative example with reference to the following figures.

DETAILED DESCRIPTION OF THE PREFERRED EMBODIMENTS

The invention warns of the engagement of anti-lock braking system by adding a sound whenever the ABS is engaged. The sound can be generated by the car horn, or by another means for making a sound. Pre-recorded sounds can also be used, such as the sound of squealing tires. These sounds may be adjusted depending on conditions such as current speed or the time duration that the ABS has been engaged. In particular, the current speed can be used to cut off the sound at low speeds and to adjust the volume of the sound at higher speeds. The volume of the sound must be loud enough to be heard by vehicles 1 stopping distance away, as determined by the speed of the vehicle using the ABS.

In the figures, like-numbered boxes refer to the same elements.

Figure 1:
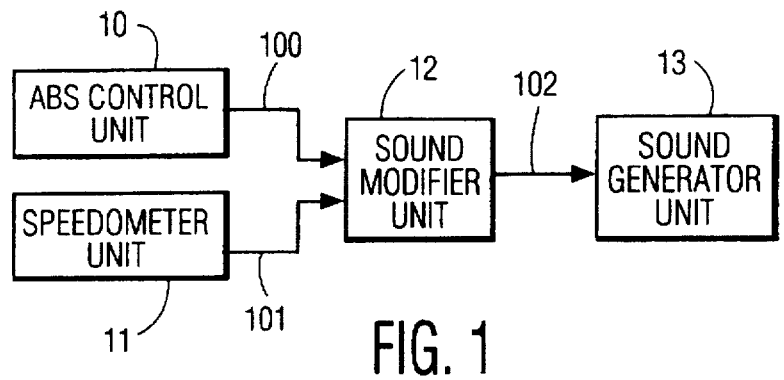
FIG. 1 is a block diagram of the functional components necessary for an ABS activated warning system that generates a warning sound.

FIG. 1 shows a block diagram of the fundamental functional components of an ABS activated warning system where the sound generator is actuated by an analog signal to provide varying volume levels of sound.

In Box 10, the ABS Control Unit is shown. This is the central controller for the ABS system. This controller is typically supplied by the automobile manufacturer and determines when and how the ABS should be activated. One of the many control signals that is standard output for this controller is an ABS-ON signal 100 which is fundamental for any subsequent intelligent control of the ABS braking system. This signal clearly identifies that the ABS is active.

In Box 11 a speedometer unit is shown. This unit determines the speed the vehicle is traveling. The speed signal 101 is an output of this device and is typically an analog signal, but may alternatively be digital. The form of the signal is not essential to this invention. Conventionally, it is an analog signal which supplies the current velocity to the driver's speedometer display in the car, and may be used for other purposes such as cruise control.

The sound modifier unit in box 12 adjusts the volume control signal 102 depending upon the speed signal 101 and the abs-on signal 100. The volume is zero if the ABS system is not engaged.

The sound generator unit 13 will generate a sound based on the volume indicated by the sound modifier. A first sound generator is proportionally responsive to the volume control. That is, the higher the volume control, the louder the sound. A second sound generator has a fixed volume and can either be turned on or off. Car alarm horns are of the first sound generator type. Conventional car horns are of the second sound generator type.

Figure 2:
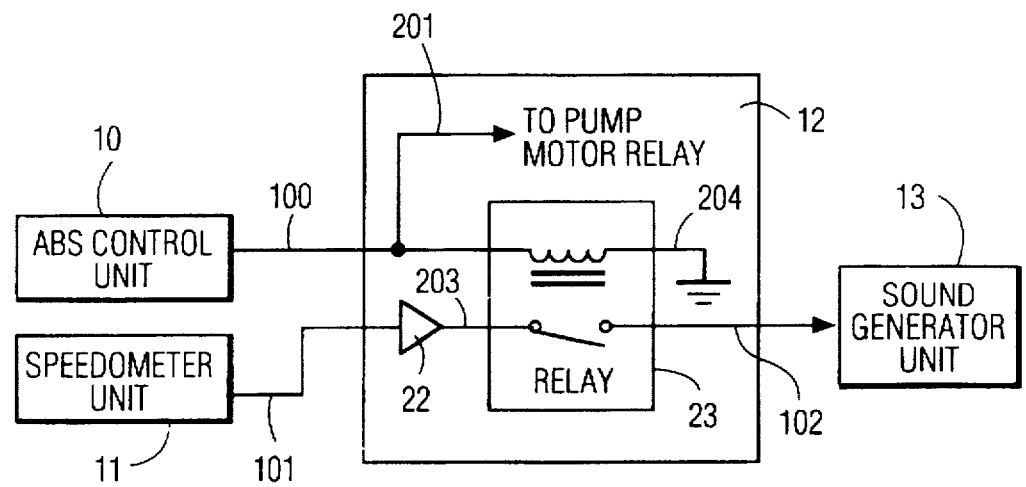
FIG. 2 is a circuit diagram corresponding to FIG. 1 that generates a warning sound in proportion to the current speed.

In FIG. 2, a circuit is shown that activates a warning sound generator in proportion to the current speed.

Signal 100 in this example is the pump motor relay control line 201. In this example, the pump motor relay is activated whenever the ABS is engaged. Signal 100 is 'high' (12 volts) when the ABS is engaged.

In this example, the speedometer has an analog output signal 101 in the range 0 to 12 volts (compatible with the car).

A linear amplifier 22 is used to amplify the speedometer output signal 101, the output of the linear amplifier 22 is signal 203.

A relay 23 uses the input from the signal of line 100 and the signal of line 203. The relay requires a ground connection 204 to operate. When the signal of line 100 is 'high', this closes the relay 23 which then connects the signal of line 203 to signal of line 102, and drives the sound generator unit 13.

Figure 3:
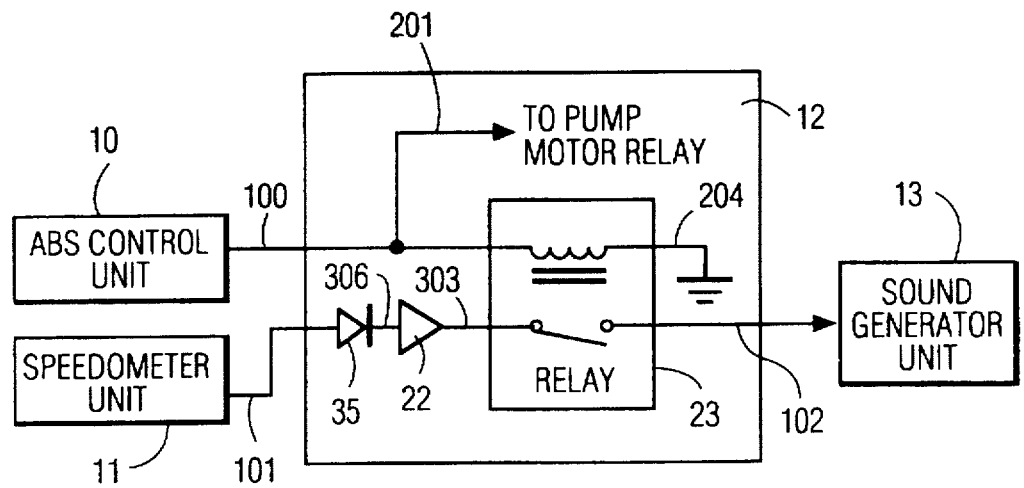
FIG. 3 is a circuit diagram corresponding to FIG. 1 that generates a warning sound in proportion to the current speed, as long as the current speed is above a threshold.

In FIG. 3, a circuit is shown that activates a warning sound generator in proportion to the current speed, but only if the speed is above a predetermined threshold.

Signal 101 of FIG. 3 leads to diode 35 from the speedometer unit 11.

The addition of diode 35 to the circuit provides the means to threshold the lowest speed that will generate a sound. Although a single diode is shown in the figure, more than one diode in series may be required to achieve the appropriate value. The diode operates by inhibiting any voltage from passing from line 101 to line 306, that does not exceed the rating of the diode. Thus, the rating of the diode determines the minimum speed threshold. The signal of line 306 is then connected to linear amplifier 22.

Figure 4:
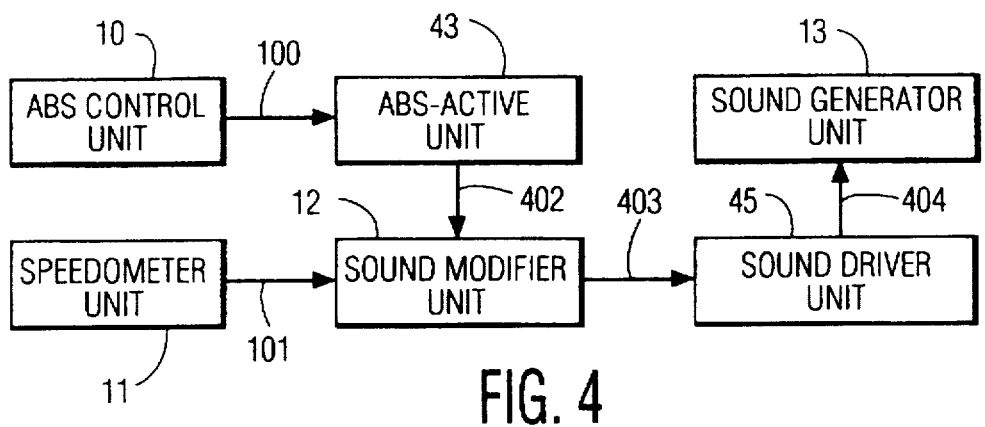
FIG. 4 is an block diagram of the functional components necessary for an ABS activated warning system that contains a mixture of TTL and high (12 volt) power circuits.

FIG. 4 shows a block diagram of the functional components of an ABS activated warning system that interfaces to a car horn. Additional functions are added to FIG. 4 to interface between (high) 12 volt analog circuits used in cars and (low) 5 volt digital circuits used in standard TTL logic.

In Box 43 an ABS-active unit is shown. This unit converts the ABS-ON signal of line 100 to the form of the signal required for the sound modifier unit in box 12. The converted signal is transferred via converted abs_on signal of line 402.

The sound modifier unit in box 12 adjusts the volume control signal of line 403 depending upon the speed signal of line 101 and the converted abs-on signal of line 402.

In Box 45, the sound driver unit is shown. The sound driver unit receives the volume control signal of line 403 and converts it to the required power level of the sound generator unit in box 13. The converted power level is output from the sound driver unit in box 45 to the sound generator unit in box 13 via the sound-driver signal of line 404.

In Box 13, the sound generator unit is shown. This unit receives its power from sound-driver signal of line 404 and responsive to that power, produces a sound. One method for generating sound is by using a car horn.

Figure 5:
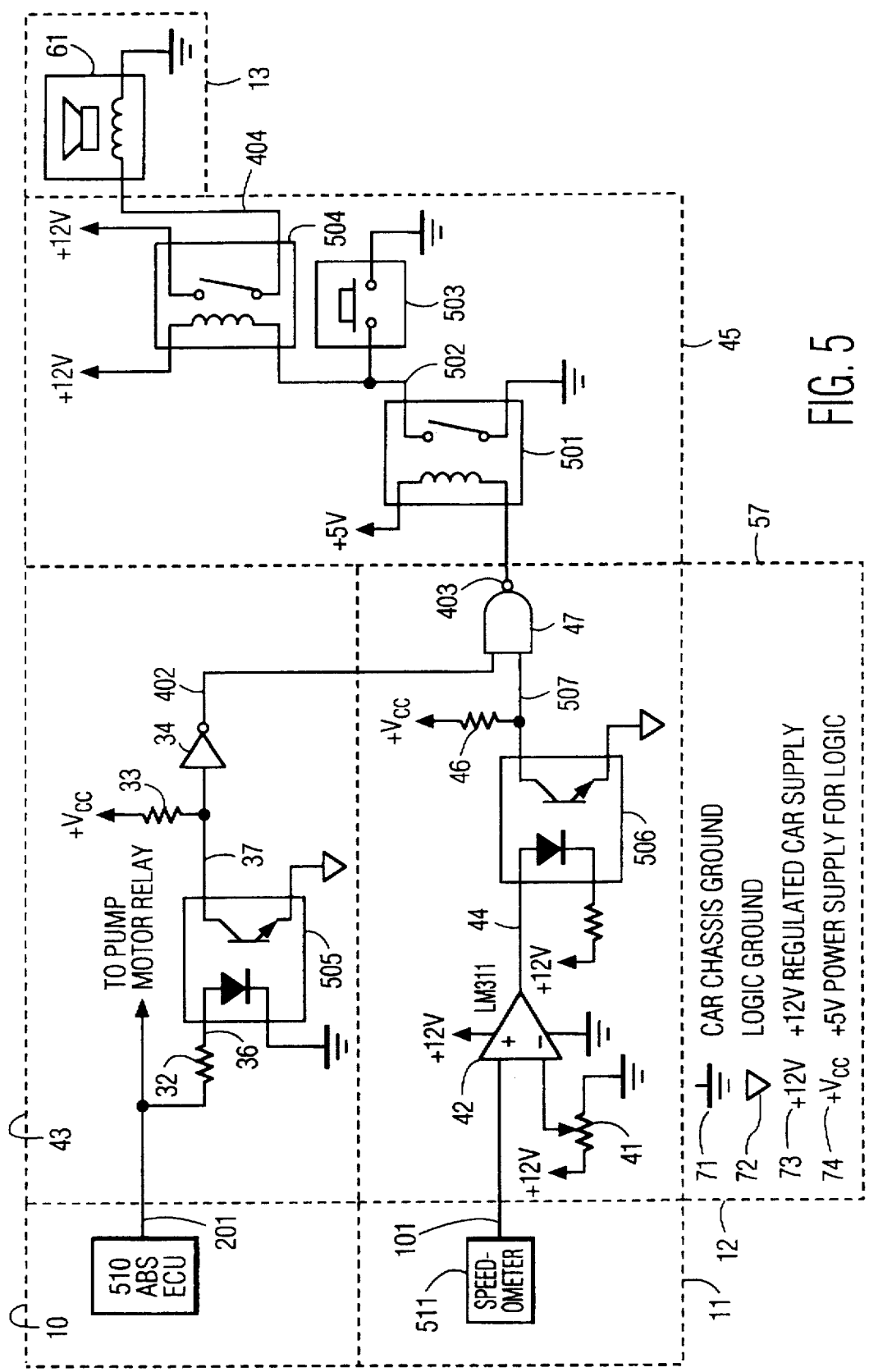
FIG. 5 is a circuit diagram that corresponds to FIG. 4 and performs a threshold-limited, ABS activated, warning system using the car horn.

FIG. 5 shows an example circuit that follows the general block diagram of FIG. 4. In this example, the circuit has a speed-threshold adjust to set the minimum speed whereby a sound will be generated. Dashed lines separate the sections of the circuit in correspondence with the block diagram.

In section 10, an Electronic Control Unit (ECU) 510 is shown. The ECU controls the Anti-Lock Braking System. The ECU outputs is the pump motor relay signal 201. This signal is active (in this example +12 volts) at the moment impending wheel lock is detected on any of the braking systems on the four wheels. This signal is therefore active when the ABS is active.

In section 11, a speedometer 511 is shown. The speedometer 511 is a device that monitors and reports the rate of vehicle travel. The speedometer 511 produces a speedometer signal 101. In this example, the output signal is analog and registers 0.1 volts for every mile per hour (MPH).

In section 43, a 'Pump Motor ON Detection Circuit' is shown. The circuit monitors the pump motor relay signal 201 of the ECU 510. The PM-ON signal 402 is an output of this circuit and will be TTL "0" when the pump motor (and therefore the ABS) is active, and is otherwise floating at TTL "1". The pump motor relay signal 201 is input to the current limiting resistor 32 which drops the voltage to an acceptable level in signal 36 for input to the opto-coupler 505. Typical values for the resistor would drop the voltage from 12 volts to between 1.5 and 1.7 volts. The opto-coupler 505 is a standard component known in the prior art. The opto-coupler provides isolation of slightly different power levels in the circuit and also acts as a switch. When signal 36 is low, i.e. near 0 volts, the opto-coupler 505 causes current to flow through pull-up resistor 33, giving a TTL "1" value to signal 37. Signal 37 is input to invertor 34 which causes a TTL value of "0" in signal 402 when the ABS system is activated.

In section 12, a 'Sound Modifier Circuit' is shown. The circuit takes in information about the current speed of the car and the status of the ABS system to determine if the sound generator should be activated. The circuit uses signal 402 from section 43 as well as signal 101 from section 10 as inputs. The circuit monitors the speedometer signal 101. The threshold is set by the speed-threshold adjust potentiometer 41. When the speed from the speedometer output signal 101 of section 10 is greater than the speed-threshold adjust potentiometer 41 as determined by comparator 42, then the speed-threshold signal 44 is TTL "0" (and "1" otherwise). when speed-threshold signal 44 is "0", current flows through the opto-coupler 506, causing current not to flow through pull-up resistor 46 and causing a TTL "0" for signal 507 when the speed is greater than the setting of the speed-threshold adjust 41. If both signal 402 from section 43 and signal 507 are both "0", then the NAND gate 47 produces a "1" for driver signal 403.

In section 45, a sound driver circuit is shown. The circuit receives the driver signal 403 from section 12 and produces the required power to the sound generator unit in section 13. When the driver signal 403 is TTL "1", the relay 501 closes, causing signal 502 to be 12 volts. To show the appropriate connection to the conventional horn circuitry, the horn-switch 503 is shown connected to signal 502. Signal 502 drives the relay 504. When signal 502 is 12 volts, the relay 504 closes and 12 volts is supplied to signal 404.

In section 13, a sound generator circuit is shown. In this case the sound generator is the car horn 61. The car horn 61 typically requires 12 volts to generate the horn sound. When signal 404 supplies 12 volts to the horn, the sound is generated. This will only occur when the ABS is engaged and the current speed is above the threshold.

In box 57, a legend is given for clarity to show the schematic elements that represent the car chassis ground 71, logic ground 72, +12 volt regulated car supply 73, and the 5 volt (logic) power supply 74.

ALTERNATIVE EMBODIMENTS

Many alternative means for providing the sound may be used. If the sound is triggered by a 12 volt signal, then it would be driven by the horn driver output 404. If it is driven by TTL logic then the warning signal 403 would be used.

Pre-recorded sounds can also be used, such as the sound of squealing tires. These sounds may be adjusted depending on conditions such as current speed or the time duration that the ABS has been engaged.

Still another sound could be a frequency that is chosen based upon a gap in the noise spectrum of a given environment. For example, on a highway, low frequency noise is often dominant. Therefore a sound in the audible high frequency range can be chosen. In the city, there may be complex combinations of frequencies, however there are typically some frequencies that are less commonly found in the environment.

Another variation is to change the volume of the sound depending on a metric (measurement) at the time of the ABS usage event. Typical metrics are the speed, time of ABS engagement, distance travelled, deceleration, etc.

The volume of the sound can be increased at higher speeds to correspond with the longer stopping distance. The volume of the sound must be at least loud enough to be heard by vehicles 1 stopping distance away, as determined by the speed of the vehicle using the ABS. Alternatively, the sound maybe attenuated at low speeds.

We claim:

1. Apparatus for warning of engagement of anti-lock braking system on a vehicle, the apparatus comprising:

means for sensing engagement of the anti-lock braking system;

means, responsive to the means for sensing, for generating a sound, when the anti-lock braking system is engaged, which sound is loud enough so that adjacent drivers and those beyond can hear it; and means for adjusting the volume of the sound responsive to a metric of an ABS event.

2. The apparatus of claim 1 wherein the means for generating the sound is a horn of the car.

3. The apparatus of claim 1 wherein the means for generating the sound emits a pre-recorded sound.

4. The apparatus of claim 3 wherein the pre-recorded sound is of squealing tires.

5. The apparatus of claim 1 wherein the means for generating the sound is a sound generator of a preset frequency, the frequency being predetermined to coincide with an expected gap in environmental noise.

6. The apparatus of claim 1, wherein the metric relates to the speed of the vehicle, so that the volume has a plurality of non-zero levels that relate to the speed.

7. The apparatus of claim 1 wherein the metric is the time elapsed since the anti-lock braking system was engaged.

8. The apparatus of claim 1 wherein the means for adjusting the volume of the sound inhibits the sound when the speed is less than a predetermined non-zero threshold.

9. The apparatus of claim 1 wherein the means for adjusting the volume of the sound amplifies the sound.

10. The apparatus of claim 1 wherein the means for adjusting the volume of the sound attenuates the sound.

* * * * *